United States Patent [19]

Costil

[11] Patent Number: 4,623,285

[45] Date of Patent: Nov. 18, 1986

[54] CUTTING TIP FOR ROTARY MACHINING, A TOOL FITTED WITH SUCH TIPS AND A PROCESS FOR SHARPENING SUCH TIPS

[75] Inventor: Marcel Costil, Cormeilles en Parisis, France

[73] Assignee: Atelier de Rectification et d'Affutage A.R.A.F., Poissy, France

[21] Appl. No.: 626,321

[22] Filed: Jun. 29, 1984

[30] Foreign Application Priority Data

Jul. 1, 1983 [FR] France .................. 83 10990

[51] Int. Cl.$^4$ ............................. B26D 1/00
[52] U.S. Cl. ..................... 407/41; 407/42; 407/50; 407/62; 407/120
[58] Field of Search .............. 407/40, 41, 42, 43, 407/48, 52, 50, 35, 36, 118, 62, 65, 120

[56] References Cited

U.S. PATENT DOCUMENTS

| 312,034 | 2/1885 | Steele | 407/65 |
|---|---|---|---|
| 2,249,437 | 7/1941 | Satterthwaite | 407/35 |
| 3,017,912 | 1/1962 | Sybertz et al. | 407/35 |
| 3,696,484 | 10/1972 | Spriggs | 407/42 |
| 4,280,774 | 7/1981 | Hayama | 407/36 |

FOREIGN PATENT DOCUMENTS

| 1908389 | 9/1970 | Fed. Rep. of Germany . | |
|---|---|---|---|
| 964326 | 4/1948 | France | 5/4 |
| 2433998 | 3/1980 | France . | |
| 2442684 | 6/1980 | France . | |
| 2514677 | 4/1983 | France . | |
| 132910 | 8/1982 | Japan | 407/54 |
| 1170670 | 11/1969 | United Kingdom . | |

Primary Examiner—Leonidas Vlachos
Attorney, Agent, or Firm—Owen, Wickersham & Erickson

[57] ABSTRACT

The cutting tips (1, 2, 3, 4) consist of sectors of an annulus, the surface corresponding to the inner arc being a segment of a cylinder in contact with a ball (11) fastened to the axle of rotation of the tool-holder (5). The tips (1, 2, 3, 4) are sharpened into a cone by means of circular grinding on their surface (1a, 2a, 3a, 4a) corresponding to the outer arc, being fastened in one and the same plane on a grinding assembly, their inner arc being in contact with an axle having the same radius as the ball (11).

The invention is used on rotary tools with multiple cutting edges, especially on spherical milling cutters and reamers.

7 Claims, 5 Drawing Figures

CUTTING TIP FOR ROTARY MACHINING, A TOOL FITTED WITH SUCH TIPS AND A PROCESS FOR SHARPENING SUCH TIPS

The present invention relates to a removable cutting tip intended for a cutting tool incorporating a tool-holder driven in rotation about an axis. The invention also relates to a tool incorporating a tool-holder driven in rotation about an axis and intended for receiving such cutting tips. The invention is moreover concerned with a process for sharpening such cutting tips.

Previously sharpened cutting tips have hitherto usually been positioned on a tool-holder, driven in rotation, by means of adjustment of the tips in relation to the tool-holder. Such an adjustment makes it possible to achieve only moderate precision.

From French Pat. No. 78/24,660 published under No. 2,433,998, it is known, for high-precision radial machining, to use a cutting tip in the form of a disk. Such a tip can be sharpened by means of circular grinding, thus resulting in a high precision.

However, this disk-shaped tip allows only a cutting tool with two cutting edges to be produced. This results in a reduced feed speed, this reduction being the more substantial, the larger the diameter.

The subject of the present invention is a cutting tip which can be sharpened with high precision and which can be fitted on a tool-holder with more than two cutting edges, whilst preserving the precision achieved during sharpening, thus allowing machining both with high precision and with a high feed speed. The subject of the invention is also a process for the high-precision sharpening of such cutting tips.

The removable cutting tip according to the invention, intended for a cutting tool incorporating a tool-holder driven in rotation about an axis, consists of a sector of an annulus, of which the surface corresponding to the inner arc is machined into a segment of a cylinder and the surface corresponding to the outer arc is machined into a segment of a cone.

The tool incorporating a tool-holder driven in rotation about an axis, which is intended for receiving such cutting tips, possesses a spherical part centered on its axis of rotation and having the same radius as that of the inner arc of the sector-shaped tips. This tool-holder also possesses means for receiving the tips and immobilizing them in contact with the said spherical part by means of their inner arc.

For sharpening the cutting tips according to the invention, a grinding assembly is used, and this has an axle having the same radius as the inner arc of the tips. The tips are fastened to this assembly in one and the same plane transverse to the said axle, the inner arc of the tips being in contact with the said axle, and the tips are sharpened into a cone by means of circular grinding on their outer arc.

Because a spherical part having the same radius as the axle of the grinding assembly is used on the tool-holder in order to support the inner arcs of the tips, the precision achieved during sharpening by means of circular grinding is repeated on the tool. In other words, each portion of the cutting edge of a tip, formed on the outer arc of the tip, occupies on the grinding assembly and on the tool-holder the same relative position in relation to the center of the axle of the grinding assembly and in relation to the center of the spherical part of the tool-holder.

The tips according to the invention can be fitted, for example, on a reamer tool-holder. For a reamer with four cutting edges, the sector-shaped tips can, in this case, be four identical tips, each covering an arc of 90°.

The tips according to the invention can also be used for a tool-holder of a spherical milling cutter, used especially for high-precision copy-milling. In this case, three of the four tips equipping the tool-holder extend over an arc slightly less than 90°, whilst the fourth tip extends over an arc slightly greater than 90°. After being fitted to the tool-holder, this fourth tip extends beyond the axis of rotation of the tool-holder and undergoes chamfer-sharpening on its part projecting beyond the axis of rotation, so as to obtain a point on the axis of rotation.

Where such a tool forming a spherical milling cutter is concerned, it is advantageous if the receptacles provided in the tool-holder for receiving the tips are arranged in such a way that the cutting face of each tip passes through the axis of rotation of the tool-holder, preferably along a radius.

With reference to the attached drawing, an illustrative and non-limiting embodiment of the subject of the invention will be described below in more detail; in the drawing.

Figure 1:
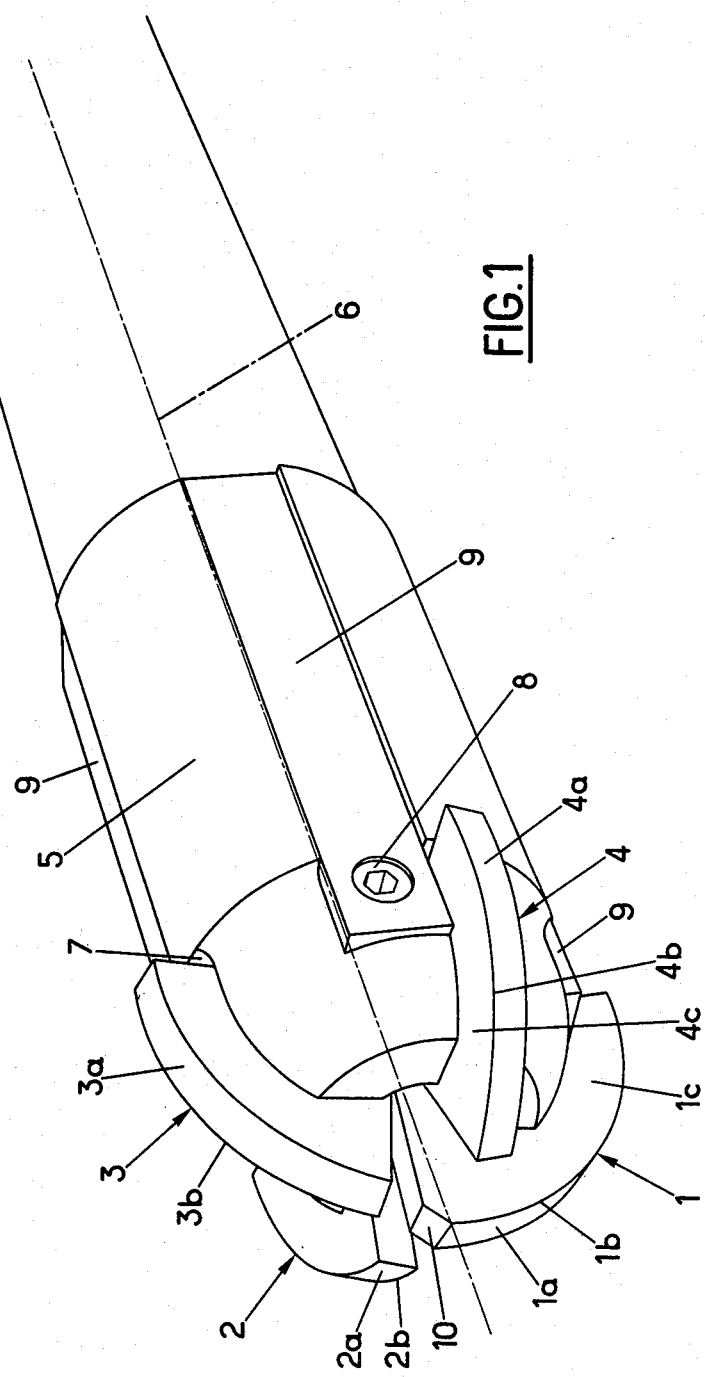
FIG. 1 is a perspective view of a tool forming a spherical milling cutter, with four cutting edges.
Figure 2:
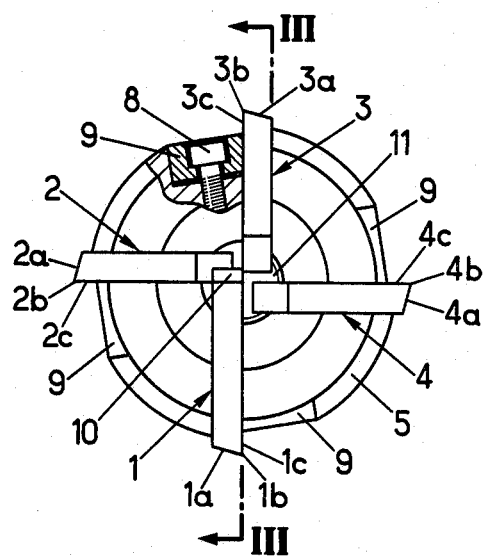
FIG. 2 is an end view, with a partial cutaway, of the tool of FIG. 1.
Figure 3:
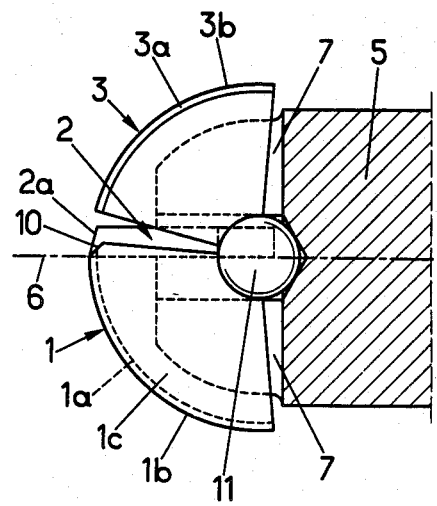
FIG. 3 is a section along the line III—III of FIG. 2.

The tool with four tips attached according to FIGS. 1 to 3 forms a spherical milling cutter, for example for precision copy-milling. The tool comprises four cutting tips 1, 2, 3, 4 attached to one end of a tool-holder 5 driven in rotation about the axis 6.

The four tips 1, 2, 3 and 4 are locked in position in receptacles 7, in the form of axial slots in the tool-holder 5, by means of screws 8 and chip-breaker plates 9.

Figure 5:
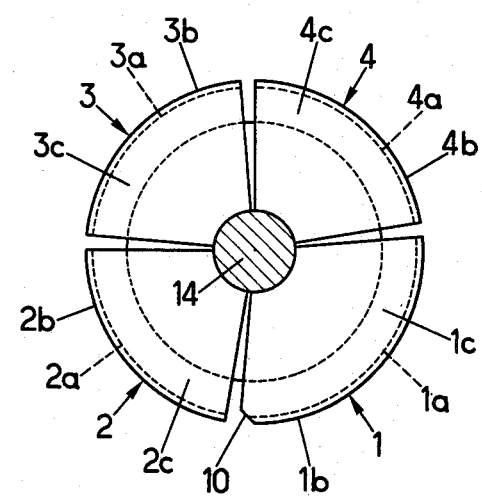
FIG. 5 is a section along the line V—V of FIG. 4.

The four tips 1, 2, 3, 4 equipping the tool-holder 5 are illustrated in FIG. 5. It will be seen that the four tips 1 to 4 have the form of sectors of an annulus, the tip 1 extending over an arc of more than 90° and the three tips 2, 3 and 4 each extending over an arc of less than 90°.

As emerges in particular from FIG. 3, only the tip 1 extends beyond the axis 6 of the tool-holder, the part projecting beyond the axis 6 being sharpened in the form of a chamfer at 10.

The tips 1, 2, 3 and 4 are machined in the form of a cylinder over their inner arc and are chamfered, that is to say machined in the form of a cone over their outer arc, so as to form a relief 1a, 2a, 3a, 4a behind the cutting edge 1b, 2b, 3b, 4b.

The tool-holder 5 has, at the bottom of the receptacles 7 of the tips, a ball 11 fastened, for example, by means of bonding, the center of the ball 11 being located on the axis of rotation 6. The radius of the ball 11 corresponds to the radius of the inner arc of the tips 1, 2, 3 and 4 in the form of an annulus.

Finally, it will be seen in FIG. 2 that the receptacles 7 receiving the tips 1, 2, 3 and 4 are offset in such a way that the cutting faces 1c, 2c, 3c, 4c of the tips pass through the axis of rotation 6.

Figure 4:
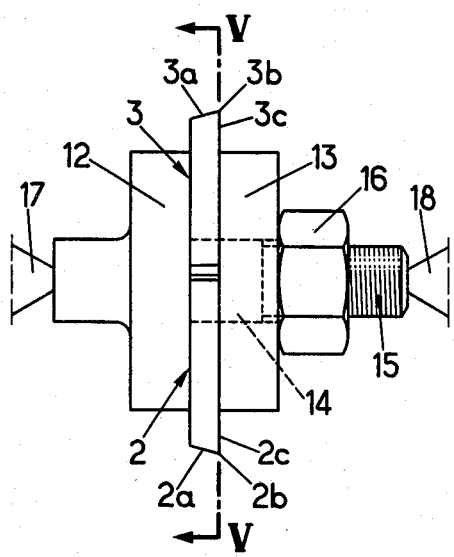
FIG. 4 is a side elevation view of a grinding assembly for sharpening the four tips of the tool of FIGS. 1 to 3.

The cutting tips 1, 2, 3 and 4 of the tool according to FIGS. 1 to 3 are sharpened by means of circular grinding, the four tips being fastened to a grinding assembly illustrated in FIGS. 4 and 5. This assembly comprises two plates 12 and 13, the plate 12 incorporating a smooth axle 14 threaded in its free end part 15, whilst the plate 13 is perforated with a hole. The radius of the smooth part of the axle 14 corresponds to the radius of the ball 11 and therefore to the radius of the inner arc of the tips 1, 2, 3 and 4. A nut 16 screwed to the threaded part 15 makes it possible to clamp the plate 13 against the plate 12. This grinding assembly can be clamped between two points 17 and 18.

The four tips 1, 2, 3 and 4 are fastened, in the way which can be seen in FIG. 5, in one and the same plane between the two plates 12 and 13, the tips bearing against the axle 14 by means of their inner arc. In this way, the tips 1 to 4 are ground to the same diameter over their outer arc, that is to say to a cone in order to form a cutting relief 1a, 2a, 3a, 4a.

Because of this circular grinding of the tips 1 to 4 which are in contact with the axle 14 by means of their inner arc, and because the tips 1 to 4 are subsequently fitted on the tool-holder 11 with their inner arc in contact with the ball 11 having the same radius as the axle 14, the precision achieved during the grinding of the tips is repeated on the tool, in that each part of the cutting edge of the tips is at an equal distance from the center of the ball 11, in the same way as it was at an equal distance from the geometrical axis of the axle 14 of the grinding assembly.

It goes without saying that the embodiment described above and illustrated in the attached drawing has been given only as an illustrative and non-limiting example and that many modifications and alternative forms are possible within the scope of the invention.

Thus, the invention can be used on other tools, for example boring tools, in which case the tips can all be identical and are advantageously arranged in such a way as to extend forwards and rearwards in relation to a plane perpendicular to the axis of rotation 6 and passing through the center of the ball 11.

The number of cutting tips equipping a tool can also be less than or greater than four, a number of tips greater than four being particularly advantageous where a large diameter is concerned.

I claim:

1. A removable cutting tip for a rotating cutting tool incorporating a tool-holder with a spherical part,
    said cutting tip comprising
    a flat-sided sector of an annulus having
    a radially inner surface corresponding to the inner arc of the annulus and machined into a segment of a cylinder adapted for being in contact with a said spherical part of a said tool holder, and having
    a radially outer surface corresponding to the outer arc of the annulus machined into a segment of a cone with an arcuate cutting edge corresponding to the arc of greatest radius of said segment of a cone at the edge where it meets one said flat side.

2. A set of tips as claimed in claim 1, wherein one only of the tips extends over a greater arc than that of the other tips.

3. A set of four cutting tips as claimed in claim 2, said one tip extending over an arc greater than 90°, whilst the other three tips extend over an arc of less than 90°.

4. A tool comprising
    a tool-holder driven in rotation about an axis and having means for receiving a set of cutting tips, said tool-holder having a spherical part centered on its axis of rotation, and
    a set of cutting tips, each of which is a flat-sided sector of an annulus with an inner surface corresponding to the inner arc of the annulus and machined into a segment of a cylinder of the same radius as and in contact with said spherical part, and having an outer surface corresponding to the outer arc of the annulus and machined into a segment of a cone with an arcuate cutting edge corresponding to the arc of greatest radius of said segment of a cone, where it meets one flat side, said spherical part receiving the tips, and
    clamping means for immobilizing said tips with the inner arc of said tips in contact with said spherical part.

5. A tool as claimed in claim 4, wherein said means for receiving comprise receptacles in the form of axial slots made in the tool-holder, so that the cutting faces of the various tips pass through the axis of rotation.

6. A tool comprising
    a tool-holder driven in rotation about an axis and having means for receiving a set of cutting tips, said tool-holder having a spherical part centered on its axis of rotation,
    a set of cutting tips, each a flat-sided sector of an annulus having an inner surface corresponding to the inner arc of the annulus and machined into a segment of a cylinder of the same radius as and for contact with said spherical part, and having an outer surface corresponding to the outer arc of the annulus and machined into a segment of a cone with an arcuate cutting edge corresponding to the arc of greatest radius of said segment of a cone, where it meets one flat side, said spherical part receiving the tips, and
    clamping means for immobilizing said tips with the inner arc of said tips in contact with said spherical part,
    one only of said tips extending over a greater arc than that of the other tips and having its arcuate cutting edge reaching the axis of rotation.

7. The tool of claim 6 having a set of four cutting tips, said one tip extending over an arc greater than 90°, whilst the other three tips extend over an arc of less than 90°.

* * * * *